(12) United States Patent
Flowerday

(10) Patent No.: US 6,534,894 B1
(45) Date of Patent: *Mar. 18, 2003

(54) AXIAL POLE MOTOR WITH SPECIFIC RELATIVE ROTOR AND STATOR STRUCTURE

(75) Inventor: Michael John Flowerday, Norfolk (GB)

(73) Assignee: Illinois Tool Works Inc., Glenview, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/785,945

(22) Filed: Jan. 22, 1997

(30) Foreign Application Priority Data

Jan. 22, 1996 (GB) ............................................... 9601214
May 20, 1996 (GB) ............................................... 9610516
Aug. 7, 1996 (GB) ............................................... 9616597

(51) Int. Cl.[7] ........................... H02K 1/27; H02K 21/00
(52) U.S. Cl. .................. 310/268; 310/156.32; 310/254
(58) Field of Search .................. 310/254, 156, 310/268, 266, 156.32, 156.33

(56) References Cited

U.S. PATENT DOCUMENTS

| | | | | |
|---|---|---|---|---|
| 3,969,644 A | * | 7/1976 | Nowak ........................ | 310/152 |
| 4,520,300 A | * | 5/1985 | Fradella ...................... | 318/603 |
| 4,605,874 A | * | 8/1986 | Whiteley ..................... | 310/268 |
| 4,710,667 A | * | 12/1987 | Whiteley ..................... | 310/268 |
| 4,731,554 A | * | 3/1988 | Hall et al. .................. | 310/67 R |
| 4,894,573 A | * | 1/1990 | Simpson ...................... | 310/217 |
| 5,124,604 A | * | 6/1992 | Swartz ........................ | 310/68 B |
| 5,168,187 A | * | 12/1992 | Baer et al. .................. | 310/49 R |
| 5,294,856 A | * | 3/1994 | Horst .......................... | 310/181 |
| 5,334,899 A | * | 8/1994 | Skybyk ........................ | 310/268 |
| 5,455,474 A | * | 10/1995 | Flynn .......................... | 310/181 |
| 5,514,923 A | | 5/1996 | Gossler et al. ................ | 310/74 |
| 5,554,902 A | * | 9/1996 | Kessens et al. ............. | 310/254 |
| 5,637,945 A | * | 6/1997 | Yamamuro et al. ......... | 310/268 |
| 5,642,009 A | * | 6/1997 | McCleer et al. ............ | 310/156 |

* cited by examiner

Primary Examiner—Burton S. Mullins
(74) Attorney, Agent, or Firm—Schwartz & Weinrieb

(57) ABSTRACT

An axial pole motor includes a stator (9) and a rotor (3) which face one another across a plane perpendicular to the rotor axis, the stator having coil windings (12) substantially uniformly circumferentially spaced and lying in planes substantially perpendicular to the rotor axis defining a number of stator poles (11), the rotor also including a number of rotor poles (4) comprising one or more permanent magnets. The number of stator poles (11) is different from the number of rotor poles (4) and the stator poles (11) and rotor poles (4) are of substantially the same size and shape to provide a pole overlap pattern in which when any one rotor pole completely covers a facing stator pole, the difference between the number of rotor poles and the number of stator poles which exist between that rotor pole and the next rotor pole which completely covers a facing stator pole is one.

22 Claims, 11 Drawing Sheets

AXIAL POLE MOTOR WITH SPECIFIC RELATIVE ROTOR AND STATOR STRUCTURE

TECHNICAL FIELD

The present invention relates to an axial pole motor. Such a motor typically comprises a stator having a number of poles with inductive windings wound on the poles and a rotor which faces the stator across a plane perpendicular to the rotor axis. Rotation of the rotor is controlled by energizing the stator windings to provide a rotating magnetic field.

DISCLOSURE OF THE INVENTION

According to a first aspect of the present invention, an axial pole motor comprises a stator and a rotor which face one another across a plane perpendicular to the rotor axis, the stator having coil windings substantially uniformly circumferentially spaced and lying in planes substantially perpendicular to the rotor axis defining a number of stator poles, the rotor also including a number of rotor poles comprising one or more permanent magnets, wherein the number of stator poles is different from the number of rotor poles and the stator poles and rotor poles are of substantially the same size and shape so as to provide a pole overlap pattern in which when any one rotor pole completely covers a facing stator pole, the difference between the number of rotor poles and the number of stator poles which exist between that rotor pole and the next rotor pole which completely covers a facing stator pole is one.

In the present invention the rotor poles in an axial pole motor comprise one or more permanent magnets. The rotor may be formed from a single toroidal magnet or, as is preferred, from a number of separate magnets. The permanent magnets increase the torque and power output of the motor. Importantly, the size and shape of the stator poles and rotor poles are substantially the same and the number of stator poles is different from the number of rotor poles. This ensures that maximum use is made of the available surface area of the stator and rotor and provides a pole overlap pattern in which when any one rotor pole completely covers a facing stator pole, the difference between the number of rotor poles and the number of stator poles which exist between that rotor pole and the next rotor pole which completely covers a facing stator pole is one. The arrangement also provides a high detent torque that is a strong cogging action. The motor is able to generate high torques and/or high power within frame sizes which are much smaller in comparison to conventional axial or radial motors.

The motor is especially suitable as a direct drive for a ram or screw, replacing conventional hydraulic drives. A separate gearbox is not required. The design allows for synchronous operation from a mains supply.

Preferably, the axial pole motor comprises a pair of stators with the rotor being positioned between the two stators. This double sided design ensures that the motor is exceptionally stable in that magnetic forces which develop in the stators are balanced.

Preferably, the permanent magnets are secured within a rotor support frame of a non-magnetic material which ensures the separation of adjacent magnets. The rotor support frame may be cast, molded or machined, or a combination of all three, in one or more parts.

In a preferred example, the rotor support frame comprises a non-magnetic hub having circumferentially spaced arms and an outer rim and the permanent magnets are secured in position within the rotor support frame using a potting compound. Alternatively, the rotor support frame may be formed from a plastic material which is injection molded with the permanent magnets in situ.

Each of the opposite faces of the rotor may be provided with a skin of non-magnetic material so that the permanent magnets are completely encased. A suitable material for such a skin is fibreglass. However, to minimize the air gaps in the assembled motor which exist between each of the opposite faces of the rotor and a respective stator, the faces of the permanent magnets may remain exposed. In this case, the faces may be plated to prevent corrosion.

The permanent magnets which form the rotor poles may be cast, molded or cut and may be pre-magnetized or magnetized in situ. Examples of suitable magnetic materials include samarium cobalt and neodymium iron boron. Magnetizing the rotor poles in situ has the advantage that unmagnetized rotor pole pieces may be fixed in position without any magnetic forces between adjacent poles interfering with the rotor assembly process. This post-magnetization technique is especially preferred when the rotor support frame is formed from plastic material in a high speed injection molding process.

Preferably, the permanent magnets are arranged in the rotor support frame so that adjacent rotor poles on each face comprise permanent magnets having opposite polarities. Furthermore, the permanent magnets on the opposite faces of the rotor may be arranged so that the rotor poles on one face are angularly offset from the rotor poles of the other face. The orientation of the permanent magnets depends upon the arrangement of the coil windings in the stator or stators and the configuration of the electrical power supply. Preferably, the permanent magnets extend between the opposite faces of the rotor in a direction parallel to the rotor axis so that pairs of poles on opposite faces of the rotor are formed by end faces of a single magnet.

Preferably, the stator is formed from a laminated toroid. Most preferably, the toroid comprises a wound length of steel strip. Suitable steel includes silicon and nickel steel strip. The steel strip may be pre-punched before winding so as to form slots for receiving the coil windings or slots may be machined in a separate step after the toroid has been wound. As an alternative, the stator may comprise a number of shaped pole pieces secured to a separate stator end plate and spaced radially around the stator end plate so as to provide the slots for the coil windings. These pole pieces may themselves be of a laminated construction. As a further alternative, the stator may be formed by machining slots in a solid toroid. The entire stator, including the coil windings, may be encased within an epoxy resin or other suitable material so as to provide mechanical rigidity and environmental protection.

Preferably, the permanent magnets in the rotor are formed so that the rotor poles have sides which extend radially outwards from the center of the rotor. Likewise, it is preferred that the slots in the stator are formed so that the sides of the slots extend radially outwards from the center of the stator.

Preferably, the angular width of the slots separating adjacent stator poles is equal to the angular width of the stator poles.

A number of different ratios of the number of rotor poles to the number of stator poles may be used providing the required pole pattern overlap condition is produced. In particular, the number of rotor poles may exceed the number of stator poles or vice versa. For a 3-φ motor, the number of stator poles must be divisible by 3. Suitable pole ratios for a 3-φ motor include 6:8 and 6:4 (the ratio of the number of stator poles to the number of rotor poles). Where a large number of rotor poles are required in the design of a motor, the faces of the stator poles may be provided with a number of slots so as to form sub-poles with sides which extend radially outwardly from the center of the stator. The sub-poles are milled so that the angular width of a stator sub-pole is equal to the angular width of one rotor pole. The sub-cut poles provide control over a wide range of operating speeds as the angular displacement of the rotor for each incremental step is reduced. This can be improved further by forming the edges of the stator poles so that the edges overhang the slots between adjacent stator poles. The pole overlap condition is achieved by considering the slots between adjacent stator poles as "fictive" poles.

Preferably, the electrical power supply and motor controller are arranged to energize the coil windings in a bipolar mode. Alternatively, the coil windings may be energized in a sequential unipolar fashion.

Cooling of the motor may be assisted, for example, by the provision of a fan.

In one preferred example, the rotor poles each comprise a permanent magnet arranged so that adjacent rotor poles have opposite polarities, wherein coil windings of adjacent stator poles are connected to a different phase and adjacent coil windings connected to the same phase are wound in the opposite sense, and wherein the number of stator poles is a factor of 12 and the number of rotor poles is a factor of 18. The pole overlap pattern provides an extremely efficient motor, generating high torques at low speeds. The motor may be driven by a conventional two phase supply. Alternatively, a single phase supply may be used, with a reactive element used to provide a phase difference between the signals supplied to the two sets of coil windings. Preferably, the permanent magnets extend between opposite faces of the rotor in a direction parallel to the rotor axis so that pairs of poles on opposite faces of the rotor are formed by end faces of a single magnet.

According to a second aspect of the present invention, an axial pole motor comprises a stator and a rotor which face one another across a plane perpendicular to the rotor axis, the stator having coil windings substantially uniformly circumferentially spaced and lying in a plane substantially perpendicular to the rotor axis defining a number of stator poles, the rotor also including a number of rotor poles each comprising a permanent magnet and arranged so that adjacent rotor poles have opposite polarities, wherein coil windings of adjacent stator poles are connected to a different phase and adjacent coil windings connected to the same phase are wound in the opposite sense, and wherein each rotor pole spans only N stator poles, where N is the number of phases.

This motor has such a high detent torque that it provides its own integral fail-safe brake. Preferably, the motor is a 2-φ motor and therefore each rotor pole spans two stator poles.

BRIEF DESCRIPTION OF THE DRAWINGS

Various other objects, features, and attendant advantages of the present invention will now be described in detail with reference also being made to the accompanying drawings, in which like reference characters designate like or corresponding parts throughout several views, and wherein.

DETAILED DESCRIPTION

Axial pole motors in the present invention rely upon a particular pole overlap pattern to generate high torques and/or high power within the smallest of frame sizes. The number of stator poles is always required to be different from the number of rotor poles and the stator poles and rotor poles are required to be of substantially the same size and shape. Furthermore, the number of stator poles must always be divisible by the number of phases of the chosen power supply. Within these constraints, the overlap pattern must be such that when any one rotor pole completely covers a facing stator pole, the difference between the number of rotor poles and the number of stator poles which exist between that rotor pole and the next rotor pole which completely covers a stator pole is one. This is illustrated in FIGS. 2A to 1C and 2A to 2C.

Figure 1A:
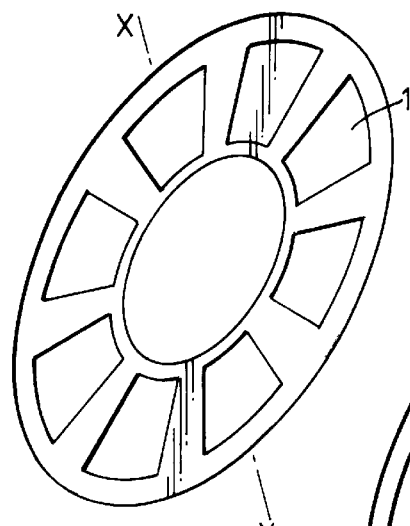
FIG. 1A is a perspective view of a rotor for use within in a 3-φ axial pole motor.
Figure 1B:
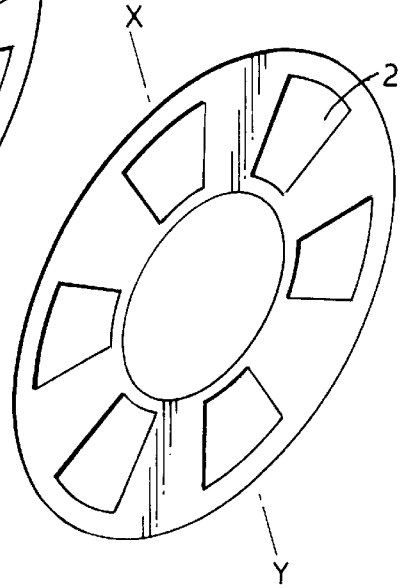
FIG. 1B is a perspective view of a stator for use within a 3-φ axial pole motor.
Figure 1C:
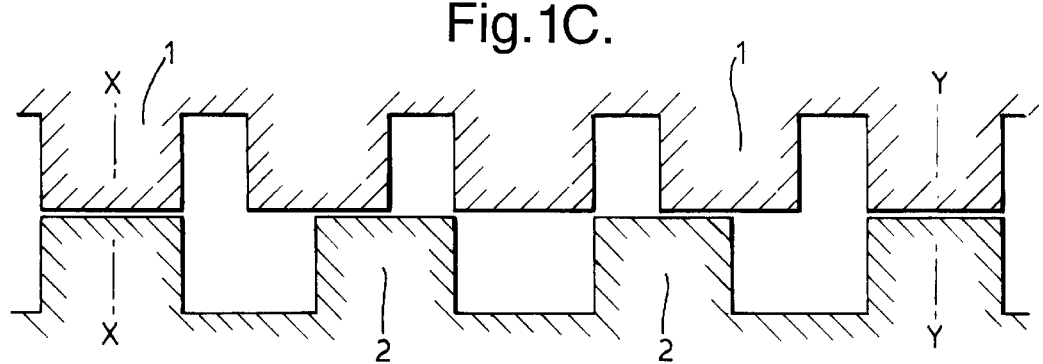
FIG. 1C is a cross-sectional view showing the overlapping relationship between the rotor of FIG. 1A and the stator of FIG. 1B within a 3-φ axial pole motor.

In FIGS. 1A to 1C, the overlap pattern for a 3-ϕ motor having eight permanent magnet rotor poles 1 and six stator poles 2 is shown that is, a 6:8 pole ratio. The poles are all substantially the same size and shape and, as shown, the difference between the number of rotor poles and the number of stator poles which exist between overlapping pairs of poles X and Y is one.

Figure 2A:
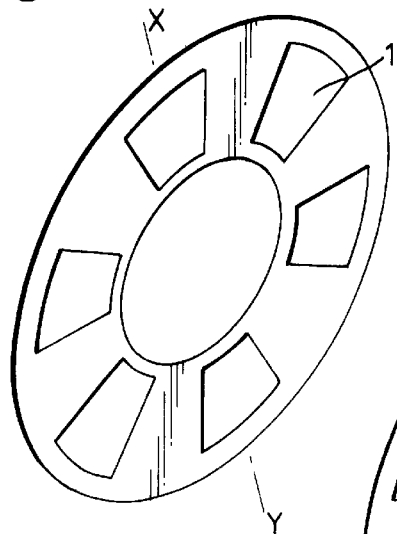
FIG. 2A is a perspective view of a rotor for use within a 2-φ or a 4-φ axial pole motor.
Figure 2B:
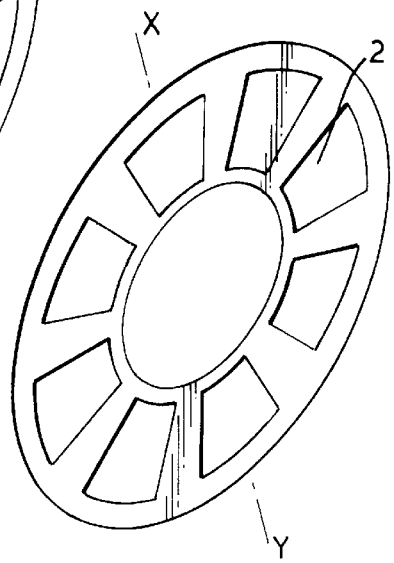
FIG. 2B is a perspective view of a stator for use within a 2-φ or a 4-φ axial pole motor.
Figure 2C:
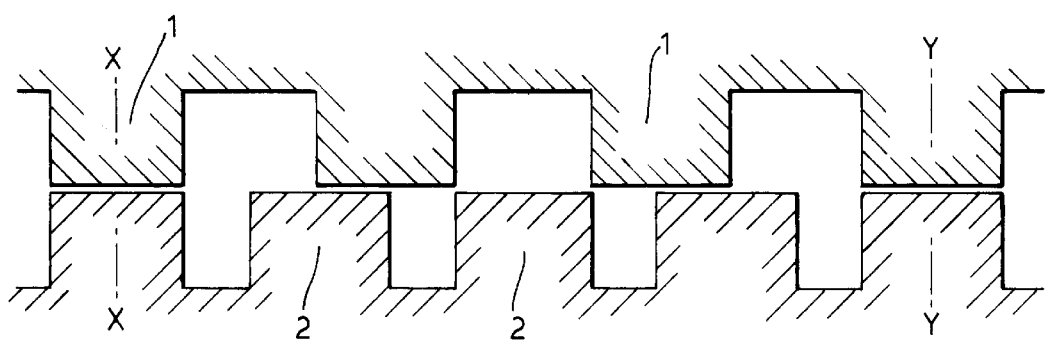
FIG. 2C is a cross-sectional view showing the overlapping relationship between the rotor of FIG. 2A and the stator of FIG. 2B within a 2-φ or a-4-φ axial pole motor.

In FIGS. 2A to 2C, the overlap pattern for a 2-ϕ or 4-ϕ motor having six permanent magnet rotor poles 1 and eight stator poles 2 is shown i.e., an 8:6 pole ratio. Again, the difference between the number of rotor poles and stator poles between the positions of complete overlap X and Y is one.

Figure 3:
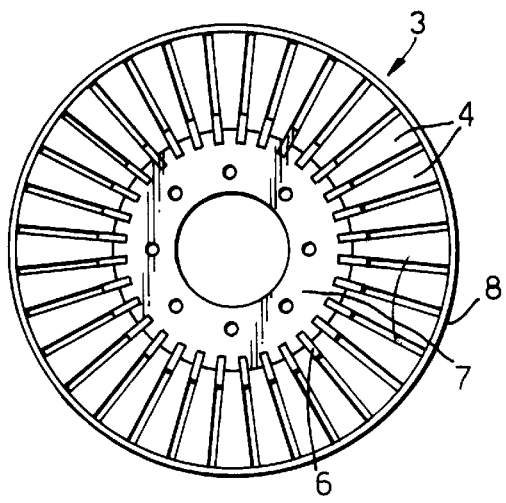
FIG. 3 is a plan view of an example of a rotor.
Figure 4:
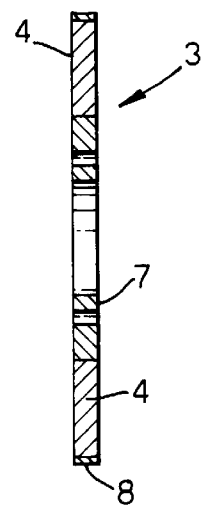
FIG. 4 is a sectional view of the rotor of FIG. 3, taken along the line 4—4 of FIG. 3.
Figure 5:
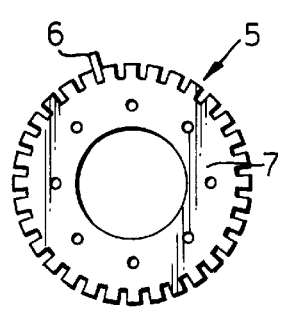
FIG. 5 is a plan view of a support hub and impeller arm for the rotor.
Figure 6:
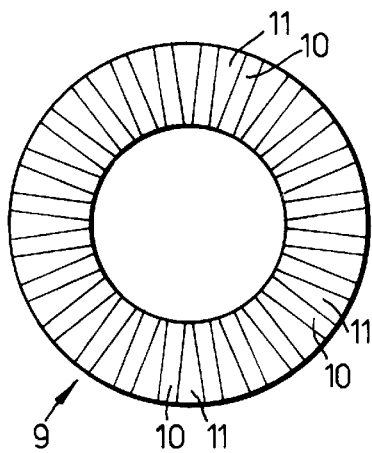
FIG. 6 is a plan view of an example of a toroidal stator former.
Figure 7:
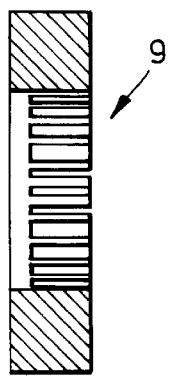
FIG. 7 is a sectional view of the stator of FIG. 6, taken along the line 7—7 of FIG. 6.

FIGS. 3 to 5 show an example of a 32-pole rotor 3 for an axial pole motor. Each pole 4 comprises a permanent magnet manufactured from samarium cobalt. The rotor 3 also comprises a rotor support frame 5 having laminated glass fibre impeller arms 6 extending radially outwardly from a central hub 7 made of the same material. The support frame 5 also includes an outer rim 8 formed from non-magnetic steel.

The rotor 3 is assembled by placing the support frame 5 on a jig (not shown) and inserting the permanent magnets one at a time between adjacent impeller arms 6 and subsequently fixing each permanent magnet in place using a potting compound. The potting compound also acts as a thermal conductor. A suitable potting compound is the epoxy resin sold under the trade name ROBNOR EPOXY SYSTEM PX/HX700K. The permanent magnets are inserted so that adjacent poles 4 in the rotor 3 are of opposite polarity. In this manner, pairs of poles on opposite faces of the rotor 3 are formed by end faces of a single permanent magnet.

The permanent magnets may be encased within the rotor support frame 5 using an annular shaped skin of glass fibre (not shown) placed overreach of the opposite faces of the rotor 3. This glass fiber skin would typically have a thickness of only 0.5 millimeters. Alternatively, the faces of the permanent magnets may simply be plated and left exposed to minimize air gaps in the assembled motor.

FIGS. 6 to 9 show one of two stators 9 used in the motor.

Each stator 9 comprises a toroid formed by winding a length of electrical steel strip around a former. As shown, the toroid is milled to provide slots 10 which define 24 salient poles 11 so that the ratio of the number of stator poles to the number of rotor poles is 6:8. This provides the necessary pole overlap pattern described above.

Figure 8:
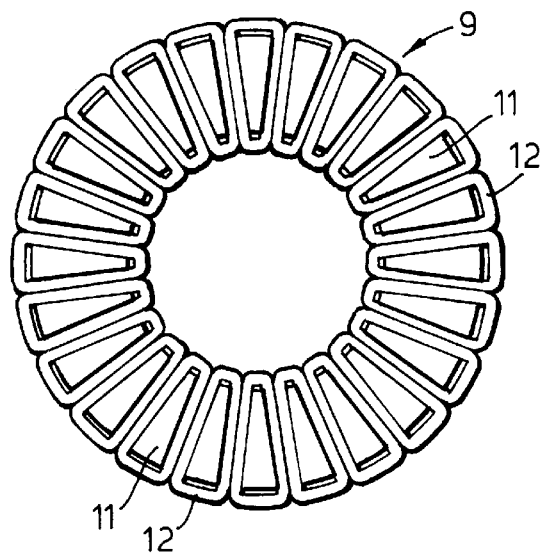
FIG. 8 is a plan view of the stator of FIGS. 6 and 7 with coil windings inserted.
Figure 9:
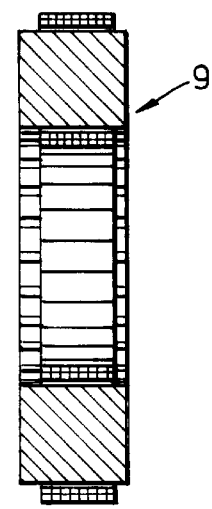
FIG. 9 is a sectional view of the stator of FIG. 8, taken along the line 9—9 of FIG. 8.

In FIGS. 8 and 9 a pre-wound coil 12 is placed around each stator pole 11 for subsequent connection to an electrical power supply. In this example, the coil windings 12 are each wound from 200 turns of AWG.22 copper coated insulation class 220° C. polyimide per J-W-1177/15 copper coated electrical wire. In this example, windings which are to be connected to the same phase of a 3-ϕ power supply, are wound in the same sense so that when energized all poles on the same phase on one stator have the same polarity. Consequently, the coil windings 12 of the corresponding poles in the opposite stator in the assembled motor (see FIG. 10) are also wound so that they have the same polarity when energized, but the opposite polarity to that of the first stator. This is illustrated in FIG. 11.

The coil windings 12 of each of the two stators 9 in the double sided motor are connected in a star configuration to a 415V AC 3-ϕ MTE controller with a variable chopping frequency (not shown). This controller energizes the windings in a sequential and cyclical manner to create a magnetic field which rotates about the axis of rotation of the rotor.

Although not shown, the entire stator 9, together with the coil windings 12, may be encased in an epoxy resin. The epoxy resin provides mechanical rigidity for the stator structure and also environmental protection.

Figure 10:
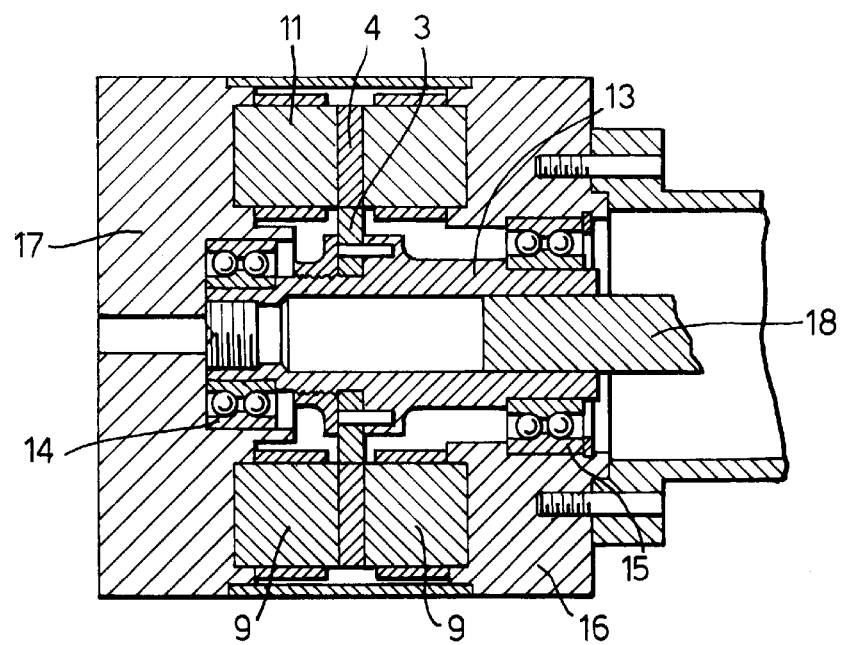
FIG. 10 is a simplified sectional view of an assembled motor.
Figure 11:
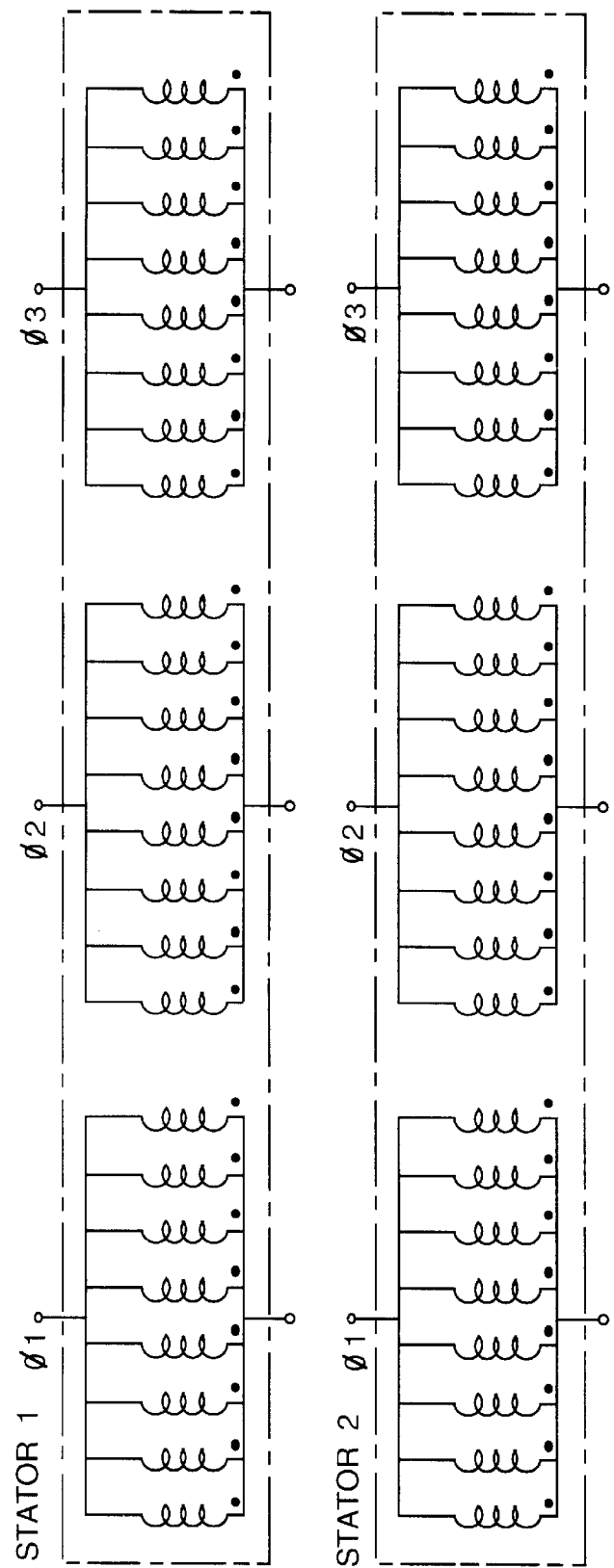
FIG. 11 is a schematic drawing showing the electrical interconnection of the motor of FIG. 10.

The complete motor is assembled as shown in FIG. 10, with the rotor 3 positioned centrally between the two stators 9. The rotor 3 is mounted for rotation on a shaft 13 supported on bearings 14 and 15 with one stator mounted on a drive end plate 16 and the other on an end plate 17. In this example, the output shaft 18 is shown connected to a screw drive of the type described in detail in U.S. Pat. No. 4,576,057.

Figure 12:
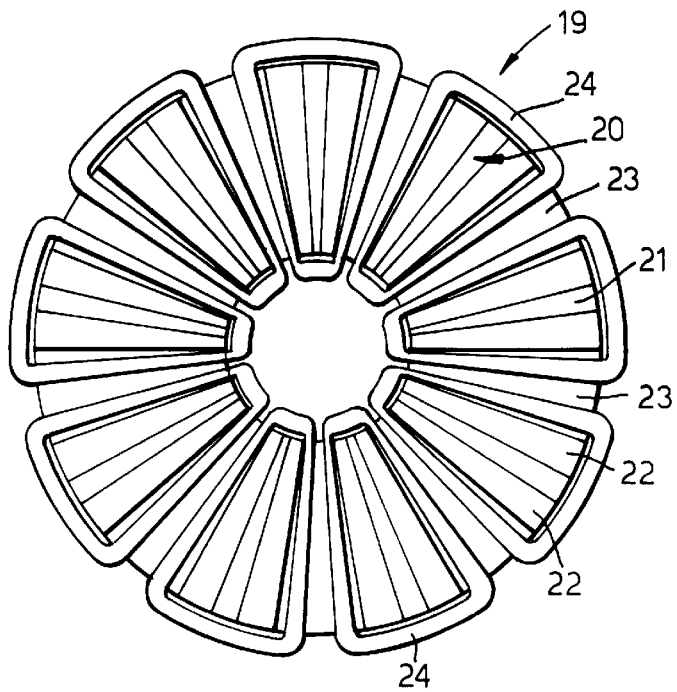
FIG. 12 is a plan view of an example of a partially assembled stator provided with sub-cut poles for another example of an axial pole motor.

FIG. 12 shows an example of a stator 19 for use in a 3-ϕ motor with a 48-pole permanent magnet rotor (not shown) having the same general construction as that shown in FIGS. 3 to 5. In this case, the face of each stator pole 20 is sub-divided by a slot 21 so as to form two sub-cut poles 22, each of which is substantially the same size and shape as the rotor poles (not shown). The total number of stator poles is therefore thirty-six, which includes what may be termed "fictive" poles created by the nine slots 23 within which the coil windings 24 lie. This represents a pole ratio of 6:8 which conforms to the required pole overlap pattern described above.

Figure 13:
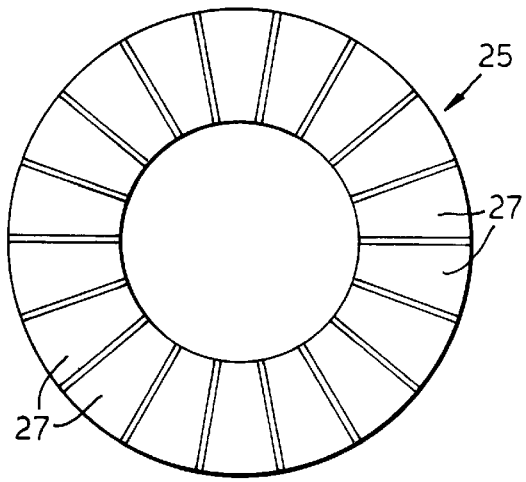
FIG. 13 is a plan view of a rotor for a further example of an axial pole motor.
Figure 14:
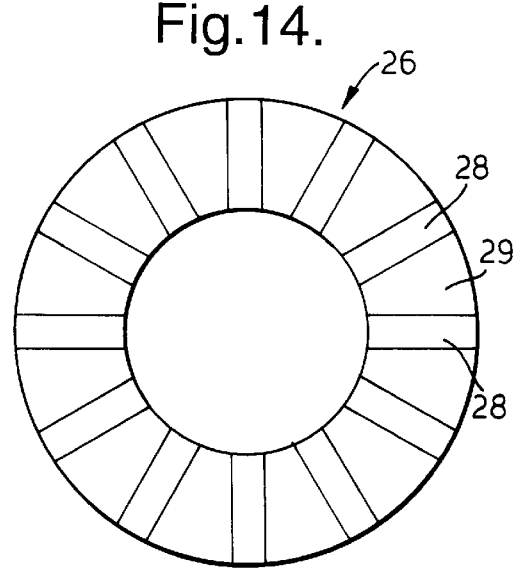
FIG. 14 is a plan view of a stator for use with the rotor of FIG. 13.

FIGS. 13 and 14 show pole patterns for a rotor 25 and a stator 26, respectively, for another example of an axial pole motor which comprises a rotor 25 and a pair of such stators 26, where the rotor 25 is to be positioned between the two stators 26 in a similar manner to that shown in FIG. 10.

Figure 15:
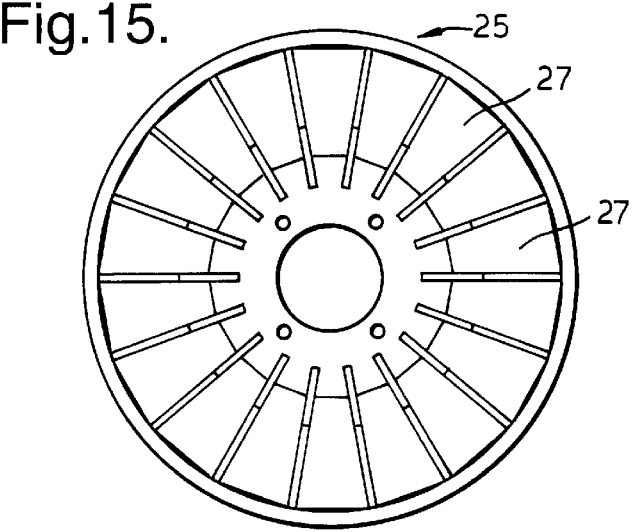
FIG. 15 is a detailed view of a partially assembled rotor.

As shown in FIG. 15, each of the eighteen rotor poles 27 comprises a permanent magnet manufactured from samarium cobalt. The permanent magnets are arranged so that adjacent rotor poles on each face of the rotor comprise permanent magnets having opposite polarities. Pairs of poles on opposite faces of the rotor 25 are therefore formed by end faces of a single permanent magnet. The rotor assembly is otherwise the same as that described with reference to FIGS. 3 to 5.

As with the previous examples of axial pole motors, each stator 26 comprises a toroid formed by winding a length of electrical steel strip around a former. The, toroid is milled to provide slots 28 which define twelve salient poles 29. Again, this provides the required pole overlap pattern described above.

Figure 16:
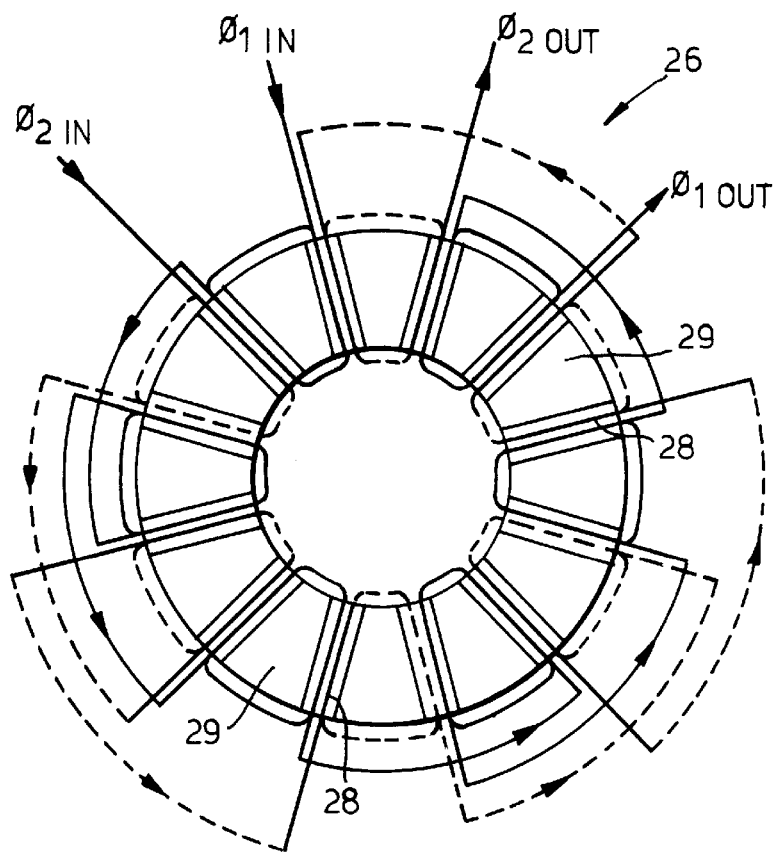
FIG. 16 is a plan view showing a coil winding arrangement with the stator of FIG. 14.

As shown in FIG. 16, coil windings of adjacent stator poles 29 are connected to a different phase $\phi_1$, $\phi_2$ of the power supply (not shown) and adjacent coil windings connected to the same phase of the power supply are wound in the opposite sense.

Figure 17:
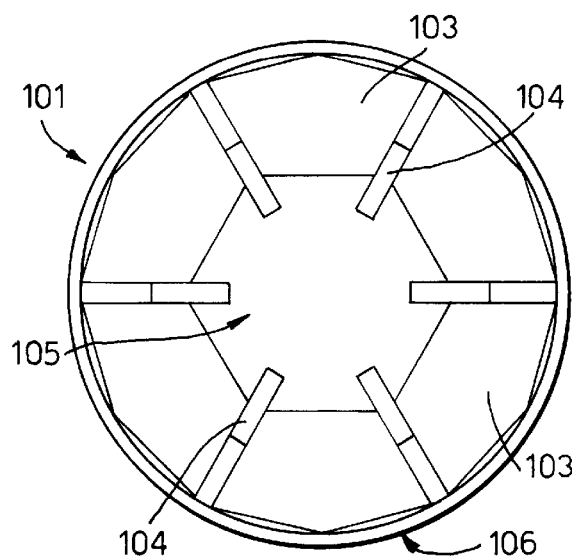
FIG. 17 is a plan view of a rotor for yet a further example of an axial pole motor.
Figure 18:
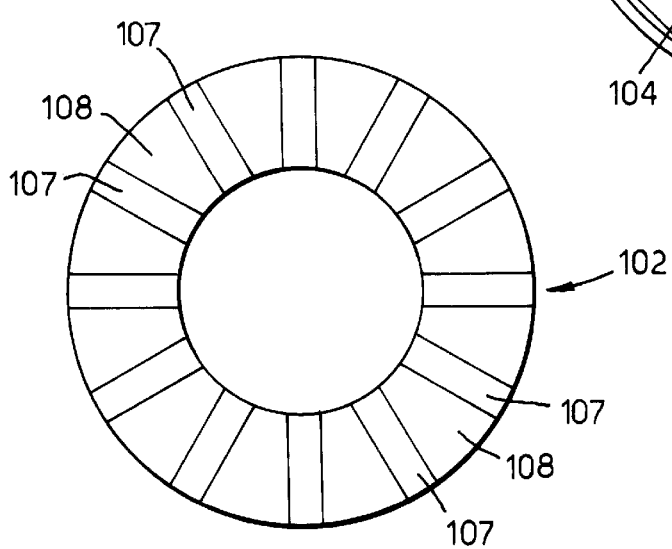
FIG. 18 is a plan view of a stator for use with the rotor of FIG. 17.

FIGS. 17 and 18 show an example of a rotor 101 and stator 102, respectively, for an axial pole motor in accordance with the second aspect of the present invention.

The rotor 101 has six poles 103, each being formed from a shaped samarium cobalt permanent magnet located within a support frame having a similar construction described with reference to the previous examples. The rotor support frame has laminated glass fiber impeller arms 104 extending radially outwardly from a central hub 105 made of the same material. This support frame also includes an outer rim 106 formed from non-magnetic steel. The rotor 101 is assembled by placing the support frame on a jig (not shown) and inserting the permanent magnets one at a time between adjacent impeller arms 104 and subsequently fixing each permanent magnet in place using a potting compound. A suitable potting compound is the epoxy resin sold under the trade name ROBNOR EPOXY SYSTEM PX/HX700K. The permanent magnets are inserted so that adjacent poles in the rotor are of opposite polarity. In this manner, pairs of poles on opposite faces of the rotor are formed by end faces of a single permanent magnet. The permanent magnets may be encased within the rotor support frame using an annular shaped skin of glass fiber (not shown) placed over each of the opposite faces of the rotor. This glass fiber skin typically has a thickness of only 0.5 mm. Alternatively, the faces of the permanent magnets may simply be plated and left exposed to minimize air gaps in the assembled motor.

Figure 19:
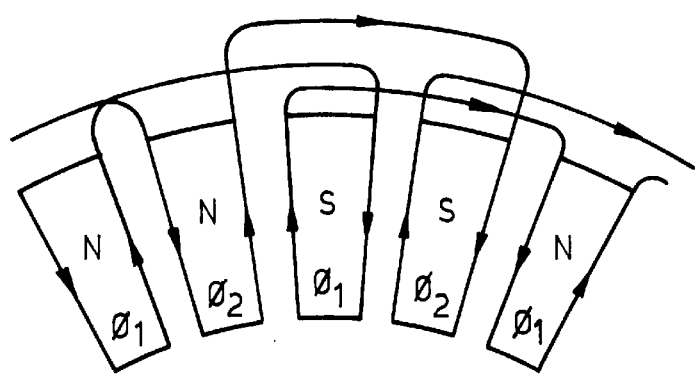
FIG. 19 is a schematic drawing showing the coil windings for use with the stator of FIG. 18.

Each stator 102 comprises a toroid formed by winding a length of electrical steel around a former. The toroid is milled to provide slots 107 which define salient poles 108. FIG. 19 shows the coil windings for the stator in a 2-φ motor. As shown, coil windings of adjacent stator poles are connected to a different phase $\phi_1$, $\phi_2$ of the power supply (not shown) and adjacent coil windings connected to the same phase of the power supply are wound in the opposite sense.

Figure 20:
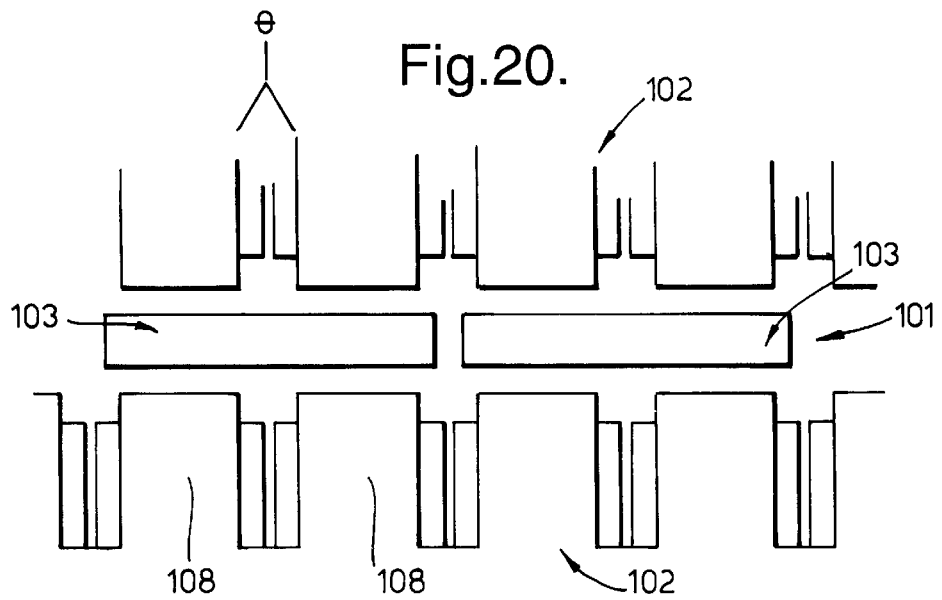
FIG. 20 is a schematic drawing showing a stator pole and rotor pole overlap arrangement of an axial pole motor.

FIG. 20 shows a simplified view of an example of an axial pole motor comprising a six-pole rotor 101 positioned between two twelve-pole stators 102. Each of the six rotor poles 103 spans only two stator poles 104 with the angular width between adjacent rotor poles being less than or equal to the angular width between adjacent stator poles 108.

Figure 21:
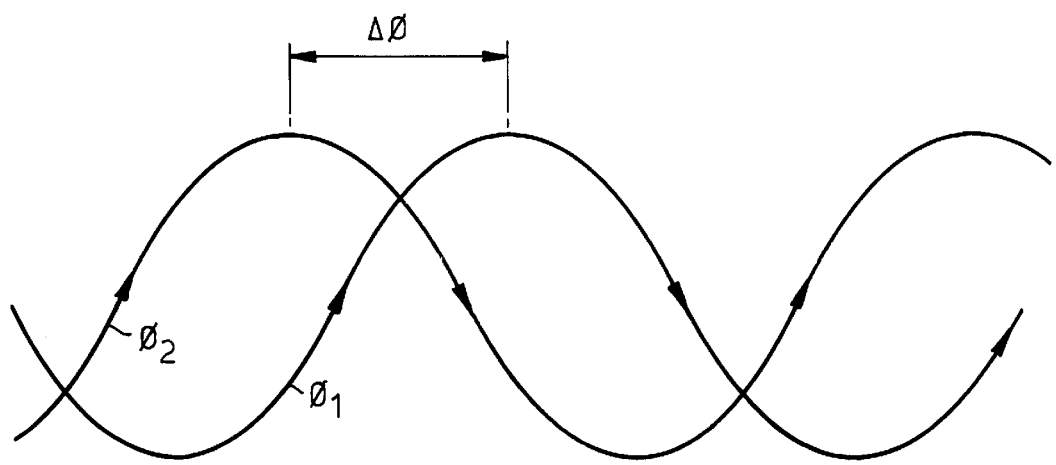
FIG. 21 is a schematic drawing showing current waveforms from a two phase power supply used to energize the coil windings of FIG. 19.

FIG. 21 shows the current waveforms applied to the coil windings. The phase difference Δφ between the two phases $\phi_1,\phi_2$ of the power supply is usually 90° but may be reduced to an angle not less than the angle θ between adjacent stator poles 108 as shown in FIG. 20.

FIGS. 22A–22D illustrate the operation of the 2-φ axial pole motor. The second stator has been omitted for clarity.

Figure 22A:
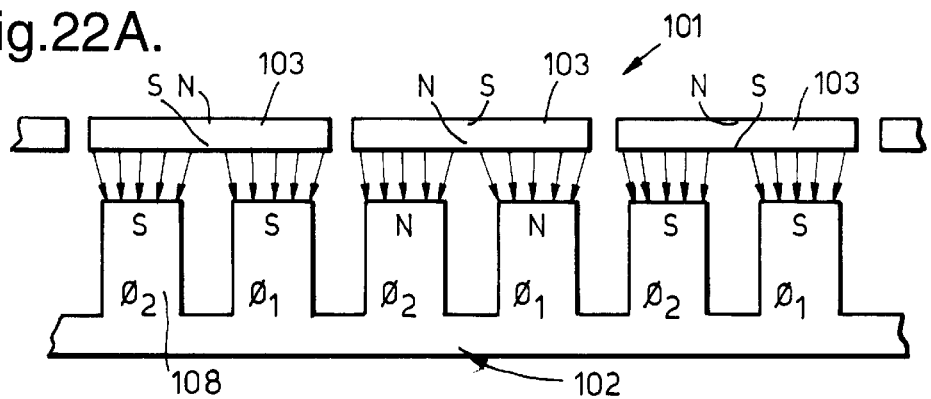
FIGS. 22A–22D are schematic drawings which will illustrate the operation of the axial pole motor.
Figure 22B:
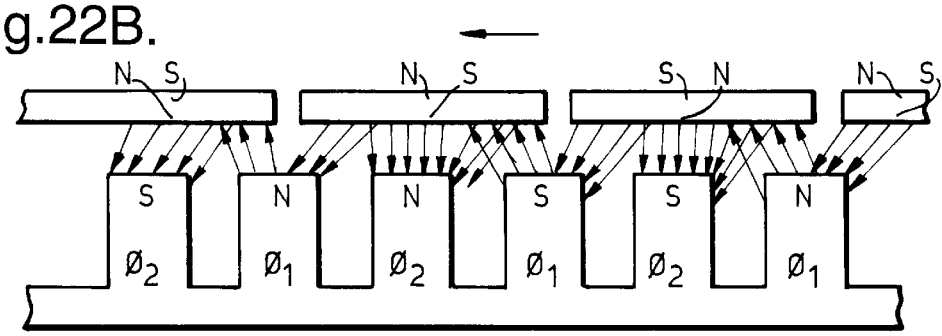

FIG. 22A shows the rotor 101 in a stable holding position wherein each rotor pole 103 lies directly over two stator poles 108. In FIG. 22B, phase 1 ($\phi_1$) of the power supply has reversed so that phase 1 stator poles, which were previously "south" poles are now "north" poles causing the rotor 101 to rotate in the direction indicated by the arrow.

Figure 22C:
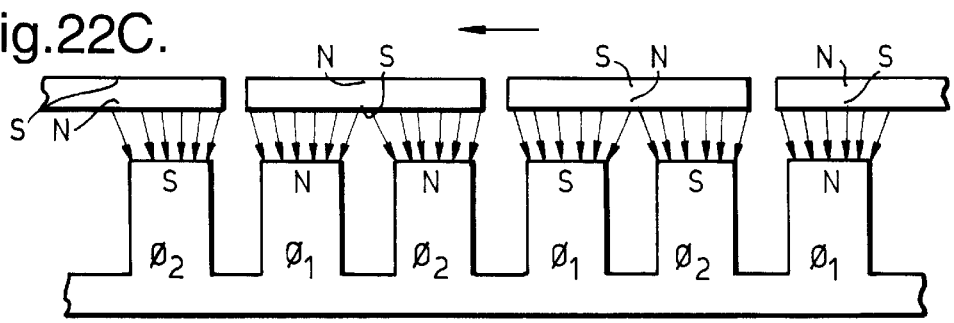

FIG. 22C shows the rotor 101 in a stable position just before the reversal of the second phase ($\phi_2$) of the power supply. At start up, the phase angle is selected to be 90° and this may be adjusted dynamically down once the motor is running.

Figure 22D:
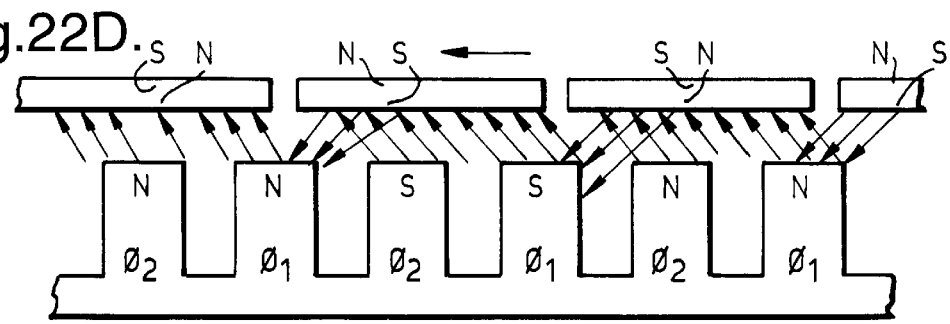

FIG. 22D shows the position just after reversal of the second phase of the power supply which causes the rotor 101 to continue to rotate.

Figure 23:
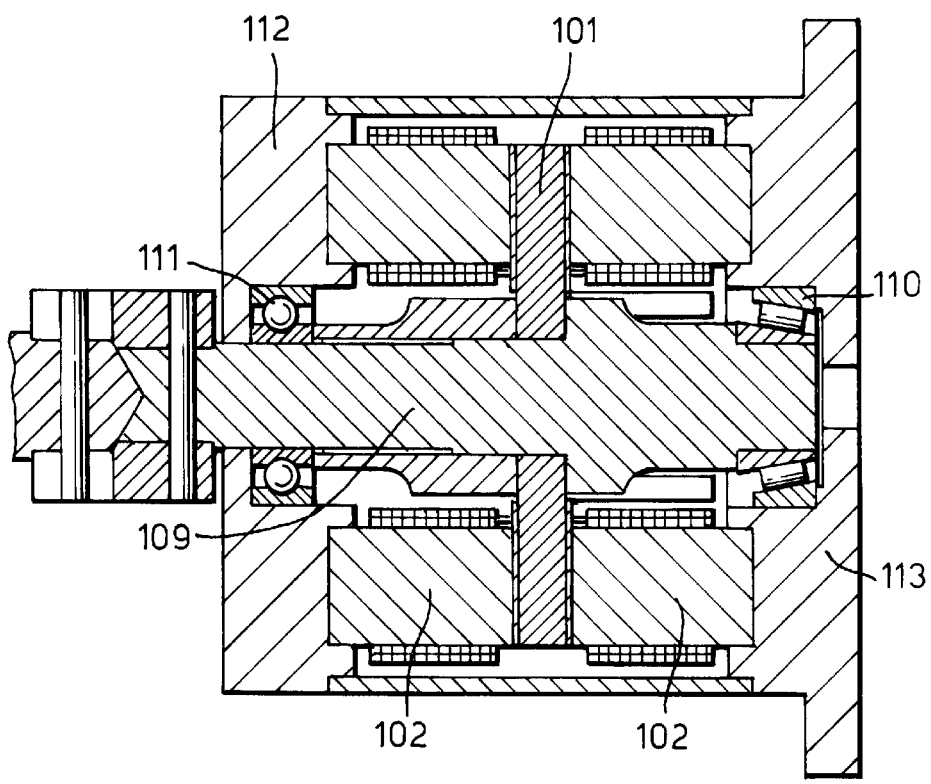
FIG. 23 is a simplified sectional view of an assembled motor.

FIG. 23 shows an assembled motor, with the rotor 101 positioned centrally between the two stators 102. The rotor 101 is mounted for rotation on a shaft 109 supported on bearings 110 and 111 with one stator 102 mounted on a drive end plate 112 and the other on an end plate 113. This axial pole motor has a particularly strong cogging action (high detent torque) and so provides an integral fail-safe brake should the power supply be cut-off.

Obviously, many modifications and variations of the present invention are possible in light of the above teachings. It is therefore to be understood that within the scope of the appended claims, the present invention may be practiced otherwise than as specifically described herein.

What is claimed is:

1. An axial pole motor, comprising:
a stator having a circumferential extent disposed about a stator axis and comprising a base, a predetermined number of stator poles which project axially from said base, and a plurality of coil windings which are respectively wound around said predetermined number of stator poles, said predetermined number of stator poles and said plurality of stator coil windings being substantially uniformly circumferentially spaced throughout said circumferential extent of said stator;
a rotor having a circumferential extent disposed about a rotor axis and being disposed opposite said stator such that said stator and said rotor face each other across a plane which is disposed perpendicular to said stator and rotor axes, said rotor comprising a base and a predetermined number of rotor poles, comprising permanent magnets, which project axially from said base and which are substantially uniformly circumferentially spaced throughout said circumferential extent of said rotor;
wherein said stator poles and said rotor poles are of substantially the same size and shape; and
wherein said predetermined number of stator poles is different from said predetermined number of rotor poles but are arranged in a pole overlap pattern with respect to each other such that when a first one of said rotor poles completely covers a first facing stator pole, the difference between the number of rotor poles and the number of stator poles, which are interposed between said first one of said rotor poles, covering said first facing stator pole, and a second one of said rotor poles, which is different from said first one of said rotor poles, which completely covers a second facing stator pole, which is different from said first facing stator pole, is one.

2. A motor according to claim 1, wherein:
said permanent magnets of said rotor are secured within a rotor support frame fabricated from a non-magnetic material.

3. A motor according to claim 2, wherein:
said rotor support frame comprises a non-magnetic hub having circumferentially spaced arms extending radially outwardly from said hub, and an outer rim; and
said permanent magnets are secured within said rotor support frame by means of a potting compound.

4. The motor as set forth in claim 3, wherein:
said rotor support frame hub and arms comprise laminated glass fiber;
said outer rim of said rotor support frame comprises non-magnetic steel; and
said potting compound comprises an epoxy resin.

5. A motor according to claim 2, wherein:
said permanent magnets are disposed within said rotor support frame so that adjacent rotor poles are comprised of permanent magnets having opposite polarities.

6. A motor according to claim 5, wherein:
said permanent magnets extend between opposite faces of said rotor in directions parallel to said rotor axis so that pairs of poles disposed upon opposite faces of said rotor and along each one of said directions formed by end faces of a single magnet.

7. A motor according to claim 1, wherein:
said stator is formed from a laminated toroid.

8. A motor according to claim 7, wherein:
said laminated toroid comprises a wound length of steel strip.

9. A motor according to claim 1, wherein:
said permanent magnets are disposed within said rotor so that said rotor poles have side portions thereof which extend radially outwardly from the center of said rotor; and
said stator comprises a plurality of slots formed therein for defining said stator poles therebetween, wherein side portions of said slots extend radially outwardly from the center of said stator.

10. A motor according to claim 9, in which the angular width of the slots separating adjacent stator poles is equal to the angular width of the stator poles.

11. A motor according to claim 9, wherein:
said stator coil windings are disposed within said stator slots; and
said stator comprises a plurality of secondary slots defined between said stator slots so as to define sub-poles between said slots and said secondary slots, wherein side portions of said secondary slots extend radially outwardly from said center of said and said stator sub-poles and said rotor poles are of the same size and shape.

12. A motor according to claim 1, wherein:
said permanent magnets of said rotor are disposed so that adjacent rotor poles have opposite polarities;
said coil windings of adjacent stator poles are connected to a different phase of a power supply; and
adjacent coil windings of said stator connected to the same phase of a power supply are wound in the opposite direction.

13. A motor according to claim 12, wherein:
said motor comprises a two-phase motor.

14. A motor according to claim 1, further comprising:
a second stator axially spaced from said stator such that said motor comprises a pair of stators with said rotor being interposed between said pair of stators.

15. The motor as set forth in claim 1, wherein:
said predetermined number of stator poles must be divisible by the number of phases of the power supply utilized in conjunction with said motor.

16. The motor as set forth in claim 1, wherein:
said permanent magnets comprising said rotor poles are fabricated from samarium cobalt.

17. The motor as set forth in claim 1, wherein:
said predetermined number of rotor poles is six and said predetermined number of stator poles is eight whereby a pole ratio between said stator poles and said rotor poles is 8:6.

18. The motor as set forth in claim 1, wherein:
said predetermined number of rotor poles is eight and said predetermined number of stator poles is six whereby a pole ratio between said stator poles and said rotor poles is 6:8.

19. An axial pole motor, comprising:
a stator having a circumferential extent disposed about a stator axis and comprising a base, a predetermined number of stator poles which project axially from said base, and a plurality of coil windings which are respectively wound around said predetermined number of stator poles, said predetermined number of stator poles and said plurality of stator coil windings being substantially uniformly circumferentially spaced throughout said circumferential extent of said stator;
a rotor having a circumferential extent disposed about a rotor axis and being disposed opposite said stator such that said stator and said rotor face each other across a plane which is disposed perpendicular to said stator and rotor axes, said rotor comprising a predetermined number of rotor poles, wherein each one of said predetermined number of rotor poles comprises a permanent magnet, wherein said predetermined number of rotor poles are substantially uniformly circumferentially spaced throughout said circumferential extent of said rotor, and wherein said predetermined number of rotor poles are disposed so that adjacent rotor poles have opposite polarities;
said coil windings of adjacent stator poles are connected to a different phase of a power supply while adjacent coil windings of said stator which are connected to the same phase of the power supply are wound in the opposite direction; and
each one of said rotor poles spans only N stator poles wherein N is the number of phases of the power supply.

20. A motor according to claim 19, wherein:
said motor comprises a two-phase motor; and
each one of said rotor poles spans only two stator poles.

21. A motor as set forth in claim 19, wherein:
said permanent magnets of said rotor extend between opposite faces of said rotor in directions parallel to said rotor axis so that pairs of poles disposed upon opposite faces of said rotor and along each one of said directions are formed by end faces of a single magnet.

22. The motor as set forth in claim 19, wherein:
said permanent magnets comprising said rotor poles are fabricated from samarium cobalt.

* * * * *